(12) United States Patent
Sharma et al.

(10) Patent No.: US 12,471,929 B2
(45) Date of Patent: Nov. 18, 2025

(54) REPOSITIONABLE OVER THE SCOPE CLIP WITH COMPLIANT MECHANISM

(71) Applicant: BOSTON SCIENTIFIC MEDICAL DEVICE LIMITED, Galway (IE)

(72) Inventors: Deepak Kumar Sharma, Muzaffarnagar (IN); Sharath Kumar G, Kanakapura (IN)

(73) Assignee: Boston Scientific Medical Device Limited, Galway (IE)

( * ) Notice: Subject to any disclaimer, the term of this patent is extended or adjusted under 35 U.S.C. 154(b) by 412 days.

(21) Appl. No.: 18/181,255

(22) Filed: Mar. 9, 2023

(65) Prior Publication Data

US 2023/0404594 A1    Dec. 21, 2023

Related U.S. Application Data

(60) Provisional application No. 63/366,216, filed on Jun. 10, 2022.

(51) Int. Cl.
  *A61B 17/128* (2006.01)
  *A61B 17/122* (2006.01)
  *A61B 17/00* (2006.01)

(52) U.S. Cl.
  CPC ...... *A61B 17/1285* (2013.01); *A61B 17/1227* (2013.01); *A61B 2017/00296* (2013.01); *A61B 2017/00486* (2013.01)

(58) Field of Classification Search
  CPC . A61B 17/1285; A61B 17/1227; A61B 17/10; A61B 17/083; A61B 2017/00296; A61B 2017/00486; A61B 2017/00477; A61B 2017/00818; A61B 2017/00867; A61B 2017/00907
  See application file for complete search history.

(56) References Cited

U.S. PATENT DOCUMENTS

| | | |
|---|---|---|
| 5,782,865 A | 7/1998 | Grotz |
| 2013/0226199 A1 | 8/2013 | Harris et al. |
| 2014/0228864 A1 | 8/2014 | Jugenheimer et al. |
| 2016/0228108 A1 | 8/2016 | Raybin et al. |

(Continued)

FOREIGN PATENT DOCUMENTS

| | | |
|---|---|---|
| CN | 213489063 | 6/2021 |
| CN | 214805000 | 11/2021 |

(Continued)

*Primary Examiner* — Ryan J. Severson
(74) *Attorney, Agent, or Firm* — Fay Kaplun & Marcin, LLP (57) ABSTRACT

A system includes a clip, a first control member, and an adapter including a channel extending from a proximal end to a distal end. The clip includes a base portion mounted over a periphery of the adapter and arms extending distally from the portion. The arms are movable relative to one another between insertion and initial deployed configurations. The first member is releasably coupled to the portion and is movably connected to the adapter so that a longitudinal movement of the first member relative to the adapter moves the clip between the insertion configuration, the initial deployed configuration, and a review configuration. The first member is operable to retract the clip proximally over the adapter toward the insertion configuration so that the arms is forced open as the clip is retracted over the adapter freeing the clip from tissue on which it had been clipped.

20 Claims, 3 Drawing Sheets

(56) References Cited

U.S. PATENT DOCUMENTS

2020/0397445 A1   12/2020   Shikhman et al.
2021/0137507 A1    5/2021   Keren et al.
2022/0110652 A1    4/2022   Gregan et al.

FOREIGN PATENT DOCUMENTS

| | | |
|---|---|---|
| JP | 2005503231 A | 2/2005 |
| JP | 2021522986 A | 9/2021 |
| WO | 2015/157116 | 10/2015 |
| WO | 2020/094619 | 5/2022 |

REPOSITIONABLE OVER THE SCOPE CLIP WITH COMPLIANT MECHANISM

PRIORITY CLAIM

The present disclosure claims priority to U.S. Provisional Patent Application Ser. No. 63/366,216 filed Jun. 10, 2022; the disclosure of which is incorporated herewith by reference.

FIELD

The present disclosure relates to endoscopic devices and, in particular, relates to endoscopic clipping devices for treating tissue along the gastrointestinal tract.

BACKGROUND

Physicians have become more willing to perform aggressive interventional and therapeutic endoscopic gastrointestinal (GI) procedures, which may increase the risk of perforating the wall of the GI tract or may require closure of the GI tract wall as part of the procedure. Such procedures may include, for example, the removal of large lesions, tunneling under the mucosal layer of the GI tract to treat issues below the mucosa, full thickness removal of tissue, treatment of issues on other organs by passing outside of the GI tract, and endoscopic treatment/repair of post-surgical issues (e.g., post-surgical leaks, breakdown of surgical staple lines, and anastomotic leaks).

Currently, tissue may be treated via endoscopic closure devices including through-the scope clips or over-the-scope clips. Over-the-scope clips may be particularly useful for achieving closure of larger tissue defects. These endoscopic closure devices can save costs for the hospital and may provide benefits for the patient. In some cases, however, current endoscopic closure devices may be difficult to use, time consuming to position, or insufficient for certain perforations, conditions, and anatomies. For example, current over-the-scope clips generally require launching of the clip from a position in which the clip itself is not visible to the operator. That is, prior to clipping the operator may view the target tissue to be clipped and, based on this visualization of the target tissue may determine that the distal end of the device and the clip are in a desired position relative to the target tissue. Based on the observation of the target tissue, the operator then deploys the clip without being able to see the clip itself until it is deployed. Once deployed, such current over-the scope clips are generally incapable of being repositioned.

SUMMARY

The present disclosure relates to a clipping system for treating tissue which includes an adapter configured to be mounted over a distal end of an insertion device. The adapter extends from a proximal end to a distal end and including a channel extending therethrough. The system also includes a clip including a base portion configured to be mounted over a periphery of the adapter and a plurality of arms extending distally from the base portion. The plurality of arms are movable relative to one another between an insertion configuration, in which the plurality of arms extend along an exterior surface of the adapter so that distal ends of the plurality of arms are separated from one another in an open configuration to receive tissue therebetween, and an initial deployed configuration, in which the clip is moved distally off of the adapter so that the distal ends of the plurality of arms revert toward a biased closed configuration in which the distal ends thereof are drawn toward one another to grip tissue therebetween. The system also includes a first control member releasably coupled to the base portion of the clip and movably connected to the adapter so that a longitudinal movement of the first control member relative to the adapter moves the clip between the insertion configuration, the initial deployed configuration, and a review configuration, in which the adapter is permitted to be withdrawn proximally away from the clip while the first control member remains coupled to the clip to enhance visual observation of the clip, the first control member being operable to retract the clip proximally over the adapter toward the insertion configuration so that the plurality of arms is forced open as the clip is retracted over the adapter freeing the clip from tissue on which it had been clipped.

In an embodiment, the first control member includes an enlarged distal engaging a distal face of the base portion so that a remaining length of the first control member extends proximally through an opening of the base portion to a proximal end accessible to a user, an enlarged distal end of the first control member connected to the remaining length of the first control member via a joint configured to release when subject to a force exceeding a predetermined threshold value.

In an embodiment, the system further includes a first extending member configured to slidably receive the first control member therein such that the enlarged distal end of the first control member extends distally from the distal end of the first extending member to be coupled to the base portion of the clip, a proximal movement of the first control member relative to the first extending member configured to draw the clip against the distal end of the first extending member to release the joint and move the clip toward a final deployed configuration.

In an embodiment, each of the plurality of arms includes a proximal portion and a distal portion movably connected to one another via a hinge which biases each of the plurality of arms toward the closed configuration, in which the proximal and distal portions of each of the arms are bent relative to one another so that distal ends extend toward a longitudinal axis of the adapter.

In an embodiment, the distal portion of each of the plurality of arms includes an engaging feature extending laterally therefrom to engage a distal end of the adapter, when the clip is drawn proximally over the adapter, to prevent a further proximal movement of the clip relative to the adapter.

In an embodiment, when engaging features engage the distal end of the adapter, the distal portion of each of the plurality of arms engages the adapter to maintain the plurality of arms toward the open configuration.

In an embodiment, the distal end of the adapter includes a lip protruding radially outward therefrom.

In an embodiment, the distal end of each of the arms extending laterally inward relative to one another and including a tissue gripping feature.

In an embodiment, the base portion is ring-shaped.

In an embodiment, the system further includes a second control member releasably coupled to the base portion of the clip and movably connected to the adapter so that a longitudinal movement of the second control member relative to the adapter moves the clip between the insertion configuration, the initial deployed configuration, and the review configuration; and a second extending member extending longitudinally from a proximal end accessible to a user of the system to a distal end, the second control member slidably received within the second extending member so that the distal end of the second control member extends distally from the distal end of the second control member to be coupled to the clip.

A clipping system for treating tissue includes an endoscope extending longitudinally from a proximal end to a distal end; an adapter mountable over a distal end of the endoscope such that a channel of the adapter is aligned with a longitudinal axis of the endoscope; a clip including a ring-shaped base portion configured to be mounted over the adapter and a plurality of arms extending distally from the base portion, the plurality of arms movable relative to one another between an insertion configuration, in which the plurality of arms extend along an exterior surface of the adapter so that distal ends of the plurality of arms are separated from one another in an open configuration to receive tissue therebetween, and an initial deployed configuration, in which the clip is moved distally off of the adapter so that the distal ends of the plurality of arms revert toward a biased closed configuration in which the distal ends thereof are drawn toward one another to grip tissue therebetween; and first and second control members releasably coupled to the base portion of the clip and movably connected to the adapter so that a longitudinal movement of the first and second control members relative to the adapter moves the clip between the insertion configuration, the initial deployed configuration, and a review configuration, in which the endoscope is permitted to be withdrawn proximally away from the clip while the first and second control members remain coupled to the clip to enhance visual observation of the clip via the endoscope, the first and second control members being operable to retract the clip proximally over the adapter toward the insertion configuration so that the plurality of arms is forced open as the clip is retracted over the adapter freeing the clip from tissue on which it had been clipped.

In an embodiment, each of the first and second control members includes an enlarged distal engaging a distal face of the base portion with a remaining length of the first control member extending proximally through an opening of the base portion to a proximal end of the first control member accessible to a user, the enlarged distal end of the first control member being connected to the remaining length of the first control member via a joint configured to release when subject to a force exceeding a predetermined threshold value.

In an embodiment, the system further includes first and second extending members extending longitudinally from a proximal end accessible to a user of the system to a distal end, each of the first and second extending members configured to slidably receive a corresponding one of the first and second control members therein so that drawing the clip proximally against distal ends of the first and second extending members via the first and second control members releases the clip from proximal portions of the first and second control members.

In an embodiment, each of the arms includes a proximal portion and a distal portion movably connected to one another via a hinge which biases each of the arms toward the closed configuration, in which the proximal and distal portion of a first one of the arms is bent relative to the distal portion of a second one of the arms so that distal ends of the first and second arms extend toward a longitudinal axis of the adapter.

In an embodiment, the adapter includes a lip protruding radially outward from the distal end of the adapter so that, when the distal portions of the arms engage the lip, the distal portions of the arms are lifted over the adapter.

The present disclosure also relates to a method for treating tissue which includes inserting a clip to a target area in a body lumen via an endoscope, the clip mounted in an open insertion configuration over a distal end of the endoscope via an adapter, wherein in the open insertion configuration a base portion of the clip is mounted over the adapter such that arms extending distally from the base portion extend along an exterior surface of the adapter with distal ends of the arms of the clip separated from one another; drawing tissue into a channel of the adapter and between the arms of the clip; moving the clip from the open insertion configuration toward an initial deployed configuration by moving distally, relative to the endoscope, distal ends of control members releasably coupled to the base portion of the clip so that the control members push the clip distally off of the adapter freeing the arms to revert toward a biased closed configuration in which distal ends of the arms extend toward one another to grip tissue therebetween; and drawing the endoscope proximally away from the clip, while the clip remains coupled to the distal ends of the control members, toward a review configuration in which a visualization of the clip via the endoscope is enhanced.

In an embodiment, when it is determined that the clip requires repositioning, drawing the control members proximally relative to the endoscope until the clip is drawn proximally over the adapter toward the open insertion configuration, and repositioning the clip over the target tissue.

In an embodiment, the method further includes moving the clip from the review configuration toward a final deployed configuration by drawing the control members proximally relative to the endoscope so that the clip is drawn proximally against distal ends of extending members, through which the control members are slidably received, until a force exerted on the control members exceeds a predetermined threshold force, separating an enlarged distal end of each of the control members from a remaining length thereof to release the clip from the endoscope.

In an embodiment, the enlarged distal end of each of the control members are positioned against a distal face of the base portion of this clip so that a remaining length of each of the control members extends proximally through an opening of the base portion, and distal ends of the extending members are positioned immediately proximal the base portion of the clip so that the control members and the extending members are moved simultaneously relative to the endoscope to move the clip between the open insertion configuration, the initial deployed configuration and the review configuration.

In an embodiment, moving the clip toward the final deployed configuration includes moving the extending members distally relative to the endoscope until the distal ends are positioned against a proximal face of the base portion of the clip so that the clip may be drawn proximally thereagainst.

BRIEF DESCRIPTION

DETAILED DESCRIPTION

The present disclosure may be further understood with reference to the following description and the appended drawings, wherein like elements are referred to with the same reference numerals. The present disclosure relates to a clipping system and, in particular, relates to an over-the-scope endoscopic clipping system, in which an initial placement of a clip may be viewed and adjusted prior to a final deployment thereof. Exemplary embodiments of the present disclosure comprise a clip mountable over a distal end of an endoscope via an adapter. The clip is releasably coupled to a distal end of a control member, which is slidably received within an extending member. The clip is movable between an insertion configuration, an initial deployed configuration, and a review configuration via a movement of the control member and/or the extending member relative to the endoscope. The clip, in this embodiment, includes a base portion sized and shaped to be mounted over the adapter and a plurality of arms extending distally from the base portion. The arms are movable from an open configuration, in which distal ends of the arms are separated from one another to permit tissue to be received therebetween, and a closed configuration, in which the distal ends of the arms are moved toward one another to grip the tissue.

In the insertion configuration, the clip is mounted over the adapter with the base portion extending about a periphery of the adapter and proximal portions of the arms extending distally from the base portion along an exterior of the adapter to maintain the arms in the open configuration. The clip is maintained in the insertion configuration to facilitate insertion of the endoscope to a target site adjacent to tissue to be clipped so that the clip's position minimizes its occlusion of the field of view of the endoscopic vision system. The arms are biased toward the closed configuration so that, as the clip is moved distally off the adapter and the arms extend distally beyond a distal end of the adapter, the arms are freed to spring radially inward under their natural bias toward the closed configuration (e.g., to be clipped over tissue in an initial deployed configuration).

The system permits the endoscope to be withdrawn proximally away from the clip and the tissue over which the clip is clipped while the clip remains coupled to the endoscope via the control member. As the endoscope is withdrawn proximally while the clip remains in place over the target tissue, the field of view of the vision system of the endoscope widens to show the clip and the tissue clipped thereby so that the operator can determine whether the position of the clip is desirable or in need of adjustment. If the operator determines that the clip is positioned as desired, the clip is moved toward a final deployed configuration by releasing the clip from the control member such that the clip is left in place clipped over the target tissue while the rest of the device including the adapter and the endoscope are withdrawn from the body. If the operator determines that the position of the clip needs adjustment, the endoscope and the adapter coupled thereto are moved distally to a position adjacent to the clip. The clip is then drawn proximally back over the adapter (via proximal retraction of the control member) to reopen the clip the arms of which are forced open as the clip is drawn proximally over the adapter returning the clip to the insertion configuration.

After the clip has been removed from the tissue and returned to the insertion configuration, the operator can re-position the endoscope and device as desired, draw a new portion of tissue into the adapter (e.g., under suction or a using grasper applied, e.g., via a working channel of the endoscope). The user may then deploy the clip again from the adapter in this new position so that it closes over the new portion of tissue (i.e., returning to the initial deployed position). The endoscope is then withdrawn proximally once again as the clip remains coupled to the device so that the device moves again into the review configuration. The position of the clip and the clipped tissue are again observed and, this process may be repeated until the operator determines that the clip has been positioned as desired. When the operator sees that the tissue over which the clip is closed is the desired portion of tissue, the clip may be released from the control member, in the final deployed configuration. It will be understood by those of skill in the art that terms proximal and distal, as used herein, are intended to refer to a direction toward and away from, respectively, a user of the device.

Figure 1:
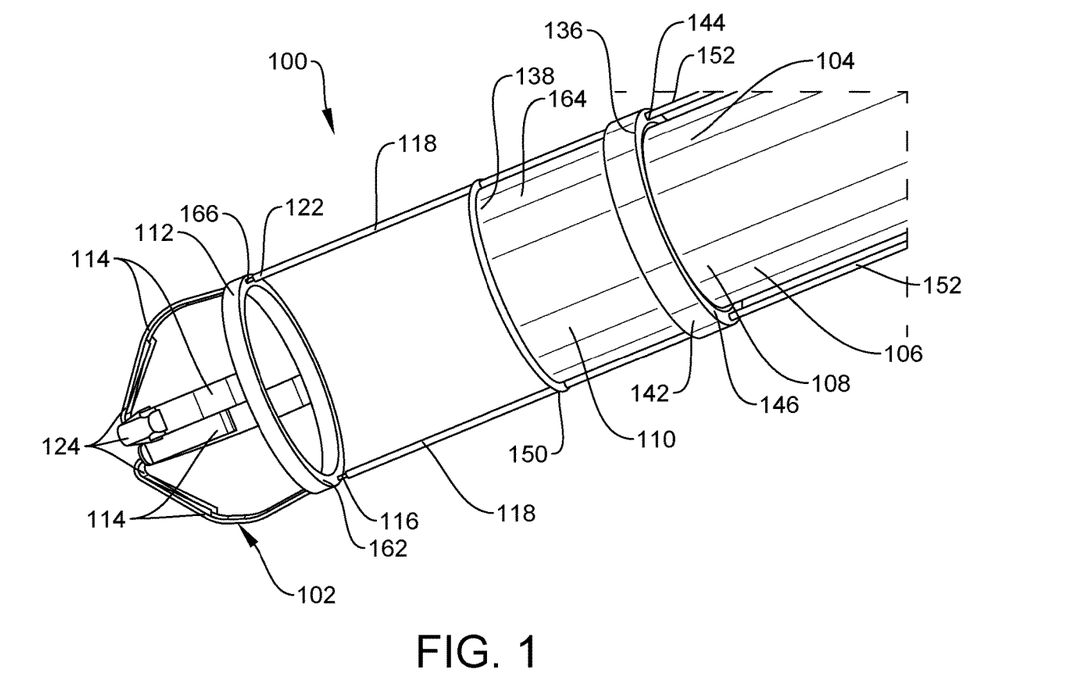
FIG. 1 shows a perspective view of a distal portion of a clipping system according to an exemplary embodiment of the present disclosure.

As shown in FIGS. 1-5, a clipping system 100 for treating tissue defects and/or perforations according to an exemplary embodiment comprises a clip 102 configured to be inserted through, for example, a body lumen to a target area to clip a target tissue thereof. The clip 102 is insertable to the target area via an insertion device 104 including, for example, an endoscope 106. As shown in FIG. 1, the clip 102 is coupled to a distal end 108 of the endoscope 106 via an adapter 110, which is mounted over the distal end 108 of the endoscope 106. According to an exemplary embodiment, the clip 102 includes a base portion 112 configured to be slidably mounted over the adapter 110 and a plurality of arms 114 extending distally from the base portion 112, the arms 114 movable between an open configuration, in which distal ends 124 thereof are separated from one another, and a closed configuration, in which the distal ends 124 are drawn toward one another. The clip 102 is releasably coupled to control members 116 via which the clip 102 is moved between an insertion configuration, in which the clip 102 is mounted over the adapter 110 in the open configuration, an initial deployed configuration, in which the clip 102 is pushed distally off of the adapter 110 toward the closed configuration, and a review configuration, in which the clip 102 is distanced from the distal end 108 of the endoscope 106 to widen a field of view thereof.

In an exemplary embodiment, each of the control members 116 include a distal end 120 coupled to the clip 102, the distal end 120 connected to a remaining length of the control member 116 via a releasable joint 160 so that, when it is desired to move the clip 102 toward a final deployment, the clip 102 may be released from the control members 116 via release and/or separation of the joint 160. Each of the control members 116 extend through a corresponding extending member 118 so that distal ends 120 of the control members 116 extend distally past distal ends 122 of the extending members 118 to be coupled to the clip 102. As will be described in further detail below, release of the joint 160 may be facilitated by drawing the control members 116 relative to the extending members 118.

In the insertion configuration, the clip 102 is mounted over the adapter 110 so that a portion of the plurality of arms 114 extend along an exterior of the adapter 110, holding the arms 114 in the open configuration in which distal ends 124 of the arms 114 are separated from one another so that tissue may be received therebetween. To move the clip 102 from the insertion configuration toward the initial deployed configuration, the extending members 118 (and the control members 116) are moved distally relative to the adapter 110, pushing the clip 102 off of the adapter 110 so that the plurality of arms 114 are moved toward a closed configuration in which the distal ends 124 are moved toward one another to grip tissue therebetween. Upon clipping of the tissue in the initial deployed configuration, the clip 102 may be moved toward the review configuration, by drawing the endoscope 106 proximally away from the clip 102 (or by moving the clip 102 distally away from the distal end 108), while remaining tethered to the insertion device 104 via the control members 116 and the extending members 118. This widens the field of view of the endoscope vision system relative to the clip 102 and the target tissue. As described below, if the user determines the position of the clip 102 is incorrect or sub-optimal, the user may move the endoscope 106 distally to a position adjacent the clip 102.

The clip 102 may then be retracted back over the adapter 110 toward the open insertion configuration by drawing the control members 116 (and the extending members 118) proximally relative to the adapter 110. The user may then reposition the endoscope 106 and the clip 102 and repeat these steps so that the placement and/or position of the clip 102 relative to a target tissue may be adjusted, as desired, prior to a final deployment of the clip 102. That is, if the operator determines in the review configuration that the clip 102 is not positioned as desired, the clip 102 may be re-opened and removed from the tissue so that the device can be re-positioned until the clip 102 is closed over the desired portion of tissue. Once it is determined that the clip 102 is clipped over the target tissue, as desired, the clip 102 may be moved toward a final deployed configuration by releasing the clip 102 from the control member 116.

As described above, the clip 102 includes the base portion 112 and the plurality of arms 114 extending distally therefrom. The base portion 112 is sized and shaped to be mounted over the adapter 110 such that the base portion 112 extends about a periphery thereof. In one embodiment, the base portion 112 may be substantially ring shaped. It will be understood by those of skill in the art, however, that the base portion 112 may have any of a variety of shapes and sizes so long as the base portion 112 is sized, shaped and configured to be slidably mounted over the adapter 110.

According to an exemplary embodiment, the base portion 112 includes a pair of openings 166 extending longitudinally therethrough from a proximal face 162 to a distal face 156 thereof. Each opening 166 is configured to receive a portion of a corresponding one of the control members 116 therethrough. In one embodiment, the openings 166 may extend through areas of the base portion 112 that are diametrically opposed to one another. Although the exemplary embodiments show and describe two openings 166, it will be understood by those of skill in the art that the base portion 112 may include any number of openings 166 so long as the number of openings 166 corresponds to a number of control members 116 of the insertion device 104.

Figure 2:
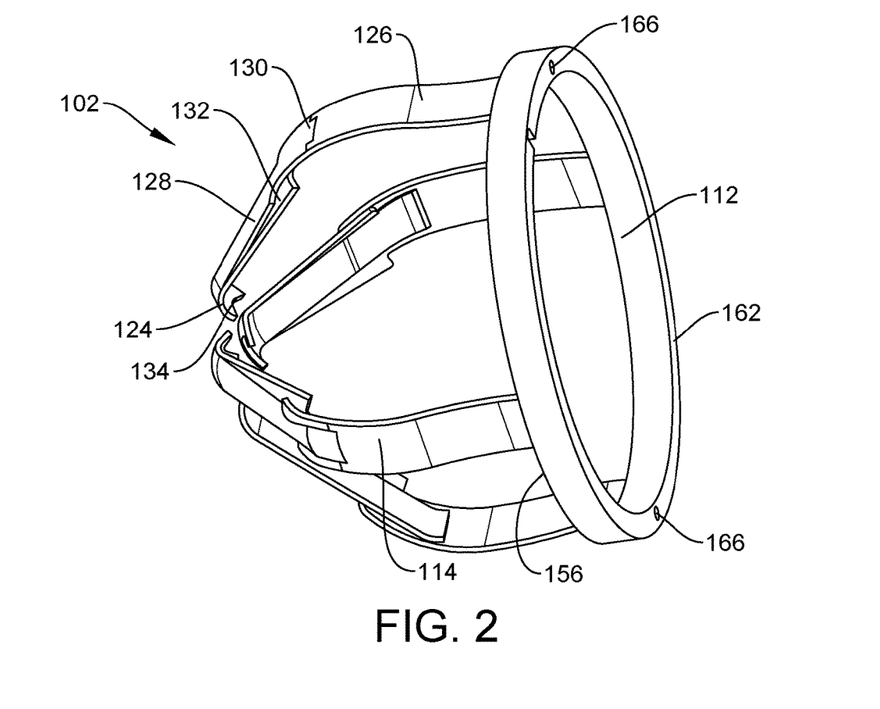
FIG. 2 shows a perspective view of a clip according to the exemplary system of FIG. 1.
Figure 3:
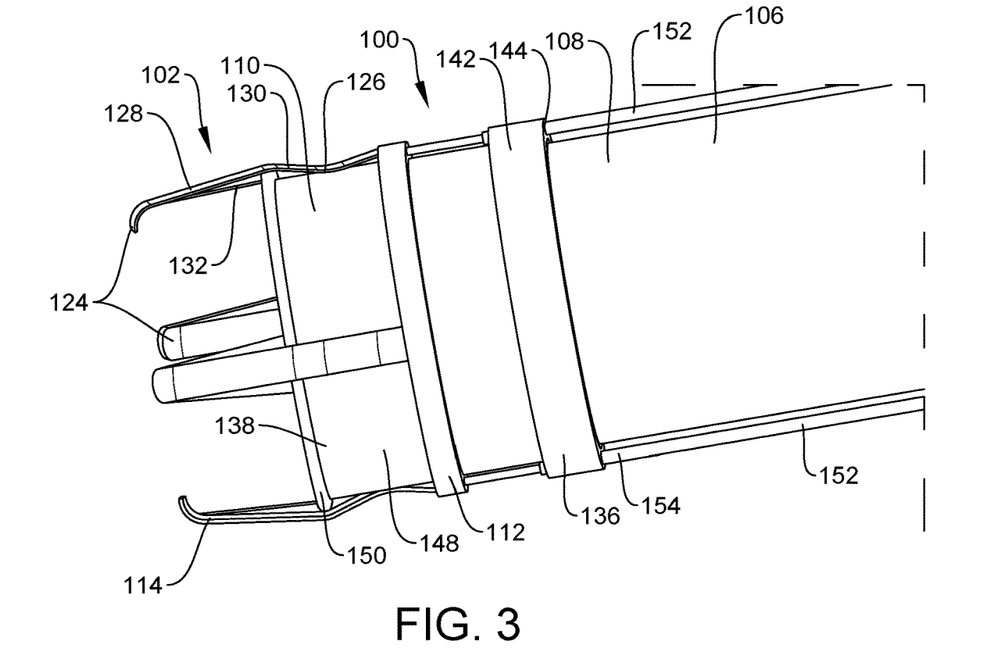
FIG. 3 shows a longitudinal side view of the distal portion of the clipping system of FIG. 1, in an open insertion configuration.
Figure 4:
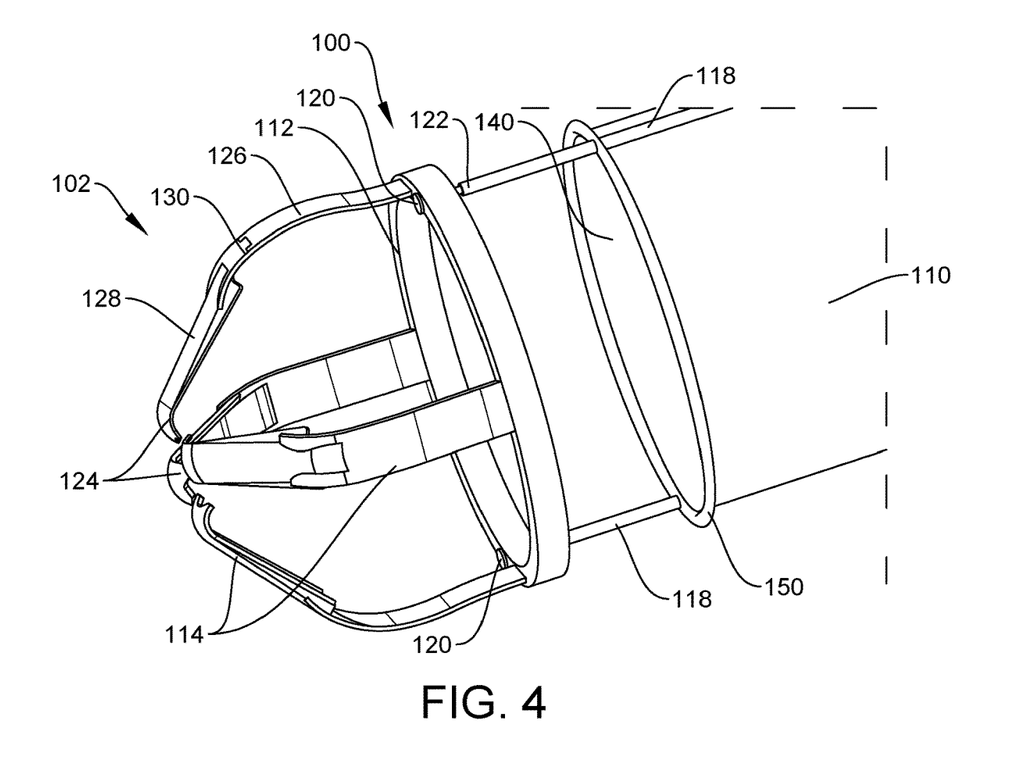
FIG. 4 shows a perspective view of the distal portion of the clipping system of FIG. 1, in a closed configuration.

As shown in FIGS. 2-4, the plurality of arms 114 extend distally from the base portion 112 to the distal ends 124, each of the arms 114 including a proximal portion 126 and a distal portion 128 movable relative to one another between the open configuration and the closed configuration. According to an exemplary embodiment, the plurality of arms 114 are biased toward the closed configuration in which the distal ends 124 are drawn toward one another. The proximal and distal portions 126, 128 of each of the arms 114 in this embodiment, are angled and/or bent with respect to one another so that, according to one embodiment, in the biased closed configuration, the proximal portion 126 extends substantially parallel to a longitudinal axis of the adapter 110 while the distal portion 128 extends at an angle relative to the longitudinal axis of the adapter 110. In this embodiment, the distal portions 128 are angled with respect to the proximal portions 126 so that the distal end 124 tapers toward the longitudinal axis of the adapter 110.

The proximal and distal portions 126, 128 of each of the arms 114 may be connected to one another via a hinge 130, which permits movement of the clip 102 between the closed configuration and the open configuration. In an exemplary embodiment, the hinge 130 is spring biased, biasing the arms 114 toward the closed configuration. In particular, when the clip 102 is mounted over the adapter 110 in the insertion configuration, the arms 114 extend along portions of the adapter 110 so that an exterior surface 164 of the adapter 110 maintains the clip 102 toward the open configuration, with the distal ends 124 of the arms 114 separated from one another.

In one example, the proximal and distal portions 126, 128 of the arms 114 may be substantially straightened relative to one another, in the open configuration, so that a tissue receiving space between the distal ends 124 is larger than conventional clips. When the clip 102 is moved distally off of the adapter 110 toward the initial deployed configuration, however, the arms 114 are permitted to revert toward their biased closed configuration, the distal portions 128 bending relative to the proximal portions 126 via the hinges 130 so that tissue may be gripped between the distal ends 124. In one embodiment, the hinge 130 may be configured as a curved portion of the arms 114 connecting the proximal and distal portions 126, 128. It will be understood by those of skill in the art that the hinge 130 and/or each of the plurality of arms 114 may be formed of any of a variety of materials so long as the hinge 130 biases the each of the arms 114 toward the closed configuration, as described above, and so that the bias is sufficiently strong to maintain the clip 102 in clipped position over target tissue after the clip has been finally deployed. In one example, portions of the clip 102 (e.g., the hinges 130) are formed of a shape memory alloy such as, for example, Nitinol to provide and/or add to the bias toward the closed configuration.

The distal portion 128 of the arms 114 includes engaging features 132 extending therefrom and configured to engage a portion of the adapter 110 so that when the engaging features 132 engage the adapter 110, the arms 114 are prevented from being moved further proximally relative to the adapter 110. According to an exemplary embodiment, the engaging features 132 extend along the distal portion 128, laterally therefrom to engage, for example, a distal end 138 of the adapter 110.

In one embodiment, the engaging features 132 may be configured as wings extending laterally from longitudinal edges of the arms 114 so that the distal portions 128 of the arms 114 have a width greater than the proximal portions 126 of the arms 114. When the arms 114 are being moved from the closed configuration toward the open configuration, the arms 114 are drawn proximally over the adapter 110 until the proximal portions 126 and the hinges 130 extend along the exterior surface 164 of the adapter 110. Once the hinges 130 are moved proximally over the adapter 110, the engaging features 132 along the distal portions 128 may abut a portion of the distal end 138 of the adapter 110. As shown in FIG. 3, the engaging features 132 are positioned along the arms 114 so that, at the point where the engaging features 132 have engaged the adapter 110, the arms 114 have been drawn sufficiently proximally over the adapter 110 so that the arms 114 and, in particular, the distal portions 128 of the arms 114, are moved toward the open configuration.

Each of the distal ends 124 of the arms 114 may include a gripping feature 134 configured to grip a tissue received between the distal ends 124. The gripping feature 134 of each arm 114 may extend laterally inward and, in one embodiment, may include a radially inwardly curved portion which may be substantially hook-shaped. The gripping feature 134 may include, for example, teeth. It will be understood by those of skill in the art that the gripping features 134 have any of a variety of configurations so long as the gripping features 134 are configured to facilitate a gripping of the tissue between the distal ends 124, when the clip 102 is in the closed configuration. For example, in the closed configuration, as shown in FIG. 4, the gripping features 134 may contact and/or extend toward one another to grip the tissue received between the distal ends 124 of the arms 114.

Although the exemplary embodiments are shown as including four arms 114, it will be understood by those of skill in the art that the clip 102 may include any number of arms 114 so long as the clip 102 includes at least two arms 114. In one embodiment, the arms 114 may be equidistantly spaced from one another about the base portion 112. It will be understood by those of skill in the art, however, that arms 114 may extend distally from the base portion 112 in any number of configurations so long as the arms 114 are configured to grip tissue between distal ends thereof.

As discussed above, the clip 102 may be mounted to the insertion device 104, which may include any standard endoscope 106. The clip 102 may be mounted to the endoscope 106 via the adapter 110, which is sized, shaped and configured to be mounted over the distal end 108 of the endoscope 106. As will be understood by those of skill in the art, the endoscope 106 is configured to be inserted through a body lumen to a target area within the lumen and thus, must be sufficiently flexible to navigate through even tortuous paths of the body lumen.

The adapter 110 extends from a proximal end 136 to the distal end 138 and includes a channel 140 extending therethrough. In one embodiment, the adapter 110 may be substantially cylindrical. It will be understood by those of skill in the art, however, that the adapter 110 may have any of a variety of shapes and configurations so long as the adapter 110 is configured to be mounted over the distal end 108 of the endoscope 106. The adapter 110 may be mounted to the endoscope 106 via, for example, a friction fit, so that the channel 140 of the adapter 110 is substantially longitudinally aligned with a channel of the endoscope 106. Thus, tissue may be viewed through the channel 140 via a viewing system of the endoscope 106. In another embodiment, to enhance a visibility of the tissue and/or the clip 102, the adapter 110 may be formed of a transparent material.

According to an exemplary embodiment, the adapter 110 may include a proximal portion 142 having a larger exterior cross-section (e.g., diameter) than a remaining distal portion 148 of the adapter 110. This proximal portion 142 may include a pair of holes 144 extending longitudinally through a wall 146 thereof. As will be described in further detail below, each of the pair of holes 144 is configured to slidably receive a corresponding one of the extending members 118 therein. Distal ends 122 of the extending members 118 extend distally past distal openings of the holes 144. Each of the extending members 118 slidably receive a corresponding one of the control members 116 therein so that distal ends 120 of the control members 116 extend distally past distal ends 122 of the extending members 118 to be releasably coupled to the clip 102.

An outer diameter of the distal portion 148 of the adapter 110 is sized, shaped and configured to permit the base portion 112 to be slidably received thereover, in the insertion configuration. In one exemplary embodiment, the distal end 138 of the adapter 110 may include a radially outwardly protruding lip 150. Although the lip 150 protrudes beyond the outer diameter of the distal portion 148, the base portion 112 is sized and shaped to be slidable proximally thereover and along the distal portion 148.

As will be described in further detail below, the lip 150 is configured so that, as the base portion 112 is slid proximally along the distal portion 148, the arms 114 slide along the lip 150 so that the lip 150 lifts the distal portions 128 of the arms 114 away from the longitudinal axis of the adapter 110. In particular, as the arms 114 are drawn proximally over the lip 150, the distal portions 128 of the arms 114 are moved relative to the proximal portions 126 of the arms via the hinges 130 so that an angle between the distal and proximal portions 128 126 is increased, thereby moving the distal ends 124 of the arms away from the longitudinal axis of the adapter 110 and away from one another. According to an exemplary embodiment, the arms 114 are moved proximally over the distal portion 148 of the adapter 110 until the engaging features 132 abut the distal end 138 of the adapter 110 preventing further proximal movement of the clip 102 relative to the adapter 110. At this point the lip 150 engages a proximal end of the distal portion 128 of each of the arms 114 to lift the distal portion 128 away from the longitudinal axis.

The extending member 118 extend along a length of the endoscope 106 from proximal ends accessible to a user via, for example, a user interface at a proximal end of the insertion device 104, to the distal ends 122. As described above, each of the extending members 118 may be slidably received within a corresponding one of the holes 144 extending through the proximal portion 142 of the adapter 110. Each of the extending members 118 may be configured as, for example, a nitinol hypotube, a plastic tube or any of a variety of structures having a coiled and/or substantially tubular configurations. The extending members 118 may have any of a variety of configurations so long as the extending members 118 are configured to slidably receive the control members 116 therein.

According to an embodiment, each of the extending members 118 may extend through, for example, an outer shaft 152 extending from a proximal end connected to a portion of, for example, the user interface, to a distal end 154 connected to the adapter 110. In particular, the distal ends 154 of the outer shafts 152 may be connected to the proximal end 136 of the adapter 110 so that each of the outer shafts 152 is in alignment with a corresponding one of the holes 144 of the adapter 110. Thus, in this embodiment, each extending member 118 extends through a corresponding one of the outer shafts 152 and the holes 144 so that the extending member 118 is longitudinally movable therewithin, relative to the endoscope 106.

Figure 5:
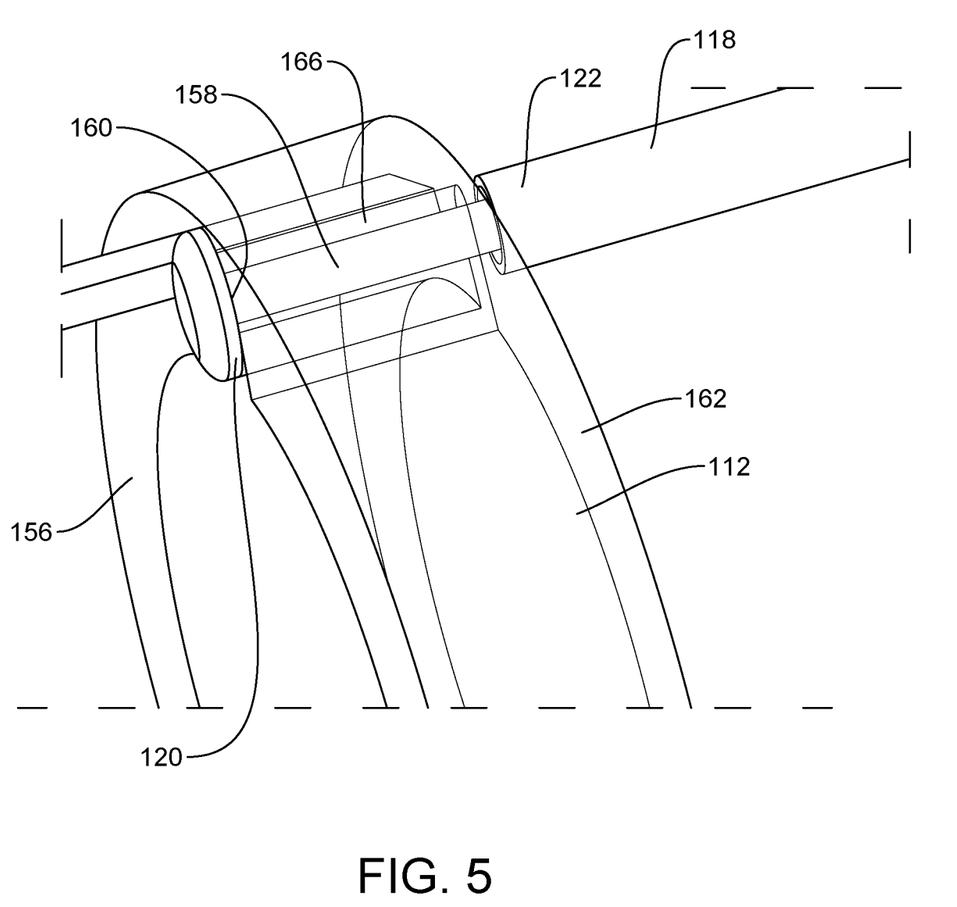
FIG. 5 shows an enlarged perspective view of a control member and an extending member connected to the clip according to the exemplary system of FIG. 1.

As described above, the control members 116 are received within the extending members 118 and extend from proximal ends connected to, for example, the user interface at the proximal end of the insertion device 104, to distal ends 120, which extend distally past the distal ends 122 of the extending members 118. In an exemplary embodiment, as shown in FIG. 5, the distal ends 120 of the control members 116 may be enlarged and coupled to the clip 102 via the openings 166 extending through the base portion. In one embodiment, the enlarged distal ends 120 are sized and shaped so that the enlarged distal ends 120 cannot pass through the openings 166. In this embodiment, the enlarged distal ends 120 of the control members 116 engage the distal face 156 of the base portion 112 so that a remaining length of the control members 116 extend proximally through the openings 166 and through the extending members 118 to the proximal end of the insertion device 104.

In one embodiment, the enlarged distal ends 120 may be affixed and/or otherwise adhered to the distal face 156 so that, upon a final deployment of the clip 102, the enlarged distal ends 120 do not result in any shed parts within the body. As described above, the enlarged distal ends 120 are sized, shaped and configured so that the enlarged distal ends 120 cannot be passed proximally through the openings 166 of the base portion 112. Similarly, the openings 166 are sized, shaped and configured to prevent a distal passage of the distal ends 122 of the extending members 118 therethrough. Thus, the base portion 112 of the clip 102 is held between the enlarged distal ends 120 of the control members 116 and the distal ends 122 of the extending members 118.

According to an exemplary embodiment, the enlarged distal ends 120 of the control members 116 are configured to be released and/or separated from a remaining length 158 thereof during the final deployment process. In one embodiment, as described above, each enlarged distal end 120 is connected to the remaining length 158 of the control member 116 via a joint 160 that is configured to break, fail, release or otherwise separate when subject to a predetermined threshold force. In one embodiment, the joint 160 may be configured as a reduced diameter portion of the control member 116.

In another embodiment, the joint may be configured as an adhesive configured to give or fail when subject to the predetermined force. In yet another embodiment, the joint be configured as a releasable coupling or other mechanical connection configured to release when subject to the predetermined force. It will be understood by those of skill in the art, however, that the joint 160 may have any of a variety of configurations so long as the joint 160 is configured to separate the enlarged distal end 120 from the remaining length 158 when subject to the predetermined threshold force. Thus, when it is desired to move the clip 102 toward the final deployed configuration, the control members 116 may be drawn proximally relative to the extending members 118 so that the enlarged distal ends 120 and the clip 102 are pulled proximally against the distal ends 122 of the extending members 118. The clip 102 is pulled proximally against the extending member 118 until a force exerted on the joint 160 reaches or exceeds the predetermined threshold force required to cause the joint 160 to break, fail or otherwise separate. The distal ends 120 are thereby released from the remaining lengths 158 of the control members 116, deploying the clip 102 from the insertion device 104.

According to one exemplary embodiment, the control members 116 and the extending members 118 are moved together, simultaneously, to move the clip 102 between the insertion configuration, the initial deployed configuration, and the review configuration. In this embodiment, the distal ends 120 of the control members 116 are affixed to and/or contact the distal face 1565 of the base portion 112 while the distal ends 122 of the extending members 118 are positioned immediately proximal a proximal face 162 of the base portion 112. Thus, the base portion 112 is held between the distal ends 120, 122 of the control members 116 and the extending members 118, respectively, such that a simultaneous movement of the control members 116 and the extending members 118 correspondingly move the clip 102.

According to an exemplary embodiment, the control members 116 and the extending members 118 may be locked relative to one another via the user interface so that a movement of one of the control members 116 and the extending members 118 correspondingly moves the other. It is only when it is desired to move the clip 102 toward the final deployed configuration that the control members 116 and the extending members 118 may be unlocked relative to one another so that the control members 116 may be drawn proximally relative to the extending members 118, pressing the base portion 112 proximally against the distal ends 122 of the extending members 118 via the distal ends 120 of the control members 116 until a force applied thereto reaches and/or exceeds a predetermined threshold value. When this force reaches the predetermined threshold value, the joint 160 breaks, fails, or otherwise separates to release the clip 102 from the remaining length 158 of the control members 116.

In another embodiment, the control members 116 and the extending members 118 may remain independently movable relative to one another. Since, however, the distal ends 120 of the control members 116 are connected to and/or affixed to the base portion 112 of the clip 102, when the extending members 118 are moved distally relative to the endoscope 106 to push the clip 102 off of the adapter 110 from the insertion configuration toward the initial deployed configuration, the control members 116 are correspondingly moved distally relative to the endo scope 106. To move the clip 102 from the initial deployed configuration toward the review configuration, the endoscope 106 may be simply withdrawn relative to the clip 102 so that the endoscope 106 is moved proximally relative to the control members 116 and/or the extending members 118.

To move the clip 102 toward the final deployment, the control members 116 may be drawn proximally relative to the extending members 118—e.g., locking a position of the extending members 118 while the control members 116 are drawn proximally relative thereto—until the joints 160 are release, separating the clip 102 from the remaining lengths 158 of the control members 116 to finally deploy the clip 102, as described above. If, however, it is desired to reposition the clip 102, the clip 102 may be moved back toward the insertion configuration by drawing the control members 116 proximally relative to the endoscope 106, allowing the extending members 118 to be correspondingly drawn proximally, until the clip 102 is pulled proximally over the adapter 110 toward the open configuration. The clip 102 may then be repositioned over tissue, as desired.

According to yet another exemplary embodiment, the clip 102 may be moved between the insertion configuration, the initial deployed configuration and the review configuration via the movement of the control members 116 relative to the endoscope 106. In this embodiment, the distal ends 120 of the control members 116 are affixed to the base portion 112 so that a movement of the control members 116 relative to the endoscope 106 correspondingly moves the clip 102. Only when it is desired to move the clip 102 toward the final deployed configuration will be extending members 118 be moved distally toward the clip 102 until the distal ends 122 are positioned immediately proximal and/or against the proximal face 162 of the base portion 112.

Then, similarly to the embodiment described above, the control members 116 may be drawn proximally relative to the extending members 118 so that the clip 102 is drawn proximally against the distal ends 122 of the extending members 118, thereby applying a force to the control members 116. When this force reaches/exceeds the predetermined threshold value, the joint 160 fails, breaks or otherwise separates to release the clip 102 from the remaining lengths 158 of the control members 116, so that the clip 102 is deployed in the final configuration, clipped over the target tissue. It will be understood by those of skill in the art that, in this embodiment, the predetermined threshold force is greater than a force required to move the clip 102 between the insertion configuration, the initial deployed configuration, and the review configuration.

According to an exemplary method for tissue closure utilizing the clipping system 100, the clip 102 may be inserted through a body lumen such as, for example, the GI tract, to a target area within the body lumen via the insertion device 104 which, in one embodiment, may include the endoscope 106. As described above, in the insertion configuration (FIG. 3), the clip 102 is mounted to the distal end 108 of the endoscope 106 via the adapter 110 so that distal ends 124 of the arms 114 of the clip 102 are separated from one another toward the open configuration. In this insertion configuration, the clip 102 is guided to the target area via the visualization system of the endoscope 106 and positioned over a target tissue.

A suction force and/or tissue graspers may be applied through a working channel of the endoscope 106 so that the target tissue may be drawn into the channel 140 of the adapter 110. Thus, when the clip 102 is moved toward the initial deployed configuration (FIG. 4) by a distal movement of the control members 116 and/or the extending members 118 relative to the endoscope 106, the clip 102 is slid distally off of the adapter 110 toward the biased closed configuration. As the clip 102 is moved toward the biased closed configuration, tissue is gripped between the distal ends 124 of the arms 114 of the clip 102 in the initial deployed configuration.

It will be understood by those of skill in the art that suctioning and/or gripping of the tissue in this initial deployed configuration may obstruct an imaging/optical lens of the endoscope 106 so that the user is unable to visualize and/or confirm whether a desired target tissue has been properly clipped. Thus, the clip 102 may be moved toward the review configuration (FIG. 1) by drawing the endoscope 106 proximally relative to the clip 102, while the clip 102 remains engaged with the control members 116. A distance between the adapter 110 and the clip 102 widens a field of view of the endoscope 106 so that the clip 102, and the tissue gripped thereby, may be viewed via the optical/visualization system of the endoscope 106.

If, upon visualization, the user determines that the clip 102 requires an adjustment and/or a repositioning relative to the target tissue, the control members 116 and/or the extending members 118 may be translated proximally relative to the endoscope 106 until the clip 102 is moved proximally over the adapter 110, as described above, toward the open insertion configuration. In particular, the endoscope 106 may be moved distally relative to the control members 116, so that the clip 102 and the adapter 110 are drawn toward one another.

As the clip 102 is moved toward the open configuration, the tissue gripped thereby is released, permitting the clip 102 to be repositioned over the target tissue, as desired. The clip 102 may then once again moved toward the initial deployed configuration, and then again toward the review configuration. This process may be repeated, as necessary, until the user is able to visually confirm that the clip 102 has been clipped over the target tissue, as desired.

As discussed above, in one embodiment, the clip 102 is moved between the insertion configuration, the initial deployed configuration and the review configuration by moving both the control members 116 and the extending members 118 together, relative to the endoscope 106. In another embodiment, the clip 102 may be moved between the insertion configuration, the initial deployed configuration and the review configuration via movement of just the control members 116 relative to the endoscope 106. Only when it is determined, during the review configuration, that the clip 102 is clipped over the target tissue as desired, the extending members 118 may be moved distally relative to the endoscope 106 so that the distal ends 122 are positioned immediately proximal the proximal face 162 of the base portion 112 of the clip 102.

The clip 102 may then be moved toward the final deployed configuration by drawing the clip 102 proximally against the distal ends 122 via the control members 116 until a force exerted on the joint 160 reaches or exceeds a predetermined threshold value, causing the clip 102 to be released from the remaining length 158 of the control members 116. Upon movement of the clip 102 toward the final deployed configuration, the insertion device 104, including the remaining length 158 of the control members 116 and the extending members 118, are removed from the body, leaving the clip 102 clipped over the target tissue.

It will be apparent to those skilled in the art that various modifications may be made in the present disclosure, without departing from the scope of the disclosure. Furthermore, those skilled in the art will understand that the features of any of the various embodiments may be combined in any manner that is not inconsistent with the description and/or the functionality of the embodiments.

What is claimed is:

1. A clipping system for treating tissue, comprising:
an adapter configured to be mounted over a distal end of an insertion device, the adapter extending from a proximal end to a distal end and including a channel extending therethrough;
a clip including a base portion configured to be mounted over a periphery of the adapter and a plurality of arms extending distally from the base portion, the plurality of arms movable relative to one another between an insertion configuration, in which the plurality of arms extend along an exterior surface of the adapter so that distal ends of the plurality of arms are separated from one another in an open configuration to receive tissue therebetween, and an initial deployed configuration, in which the clip is moved distally off of the adapter so that the distal ends of the plurality of arms revert toward a biased closed configuration in which the distal ends thereof are drawn toward one another to grip tissue therebetween; and
a first control member releasably coupled to the base portion of the clip and movably connected to the adapter so that a longitudinal movement of the first control member relative to the adapter moves the clip between the insertion configuration, the initial deployed configuration, and a review configuration, in which the adapter is permitted to be withdrawn proximally away from the clip while the first control member remains coupled to the clip to enhance visual observation of the clip, the first control member being operable to retract the clip proximally over the adapter toward the insertion configuration so that the plurality of arms is forced open as the clip is retracted over the adapter freeing the clip from tissue on which it had been clipped.

2. The system of claim 1, wherein the first control member includes an enlarged distal engaging a distal face of the base portion so that a remaining length of the first control member extends proximally through an opening of the base portion to a proximal end accessible to a user, an enlarged distal end of the first control member connected to the remaining length of the first control member via a joint configured to release when subject to a force exceeding a predetermined threshold value.

3. The system of claim 2, further comprising a first extending member configured to slidably receive the first control member therein such that the enlarged distal end of the first control member extends distally from the distal end of the first extending member to be coupled to the base portion of the clip, a proximal movement of the first control member relative to the first extending member configured to draw the clip against the distal end of the first extending member to release the joint and move the clip toward a final deployed configuration.

4. The system of claim 1, wherein each of the plurality of arms includes a proximal portion and a distal portion movably connected to one another via a hinge which biases each of the plurality of arms toward the closed configuration, in which the proximal and distal portions of each of the arms are bent relative to one another so that distal ends extend toward a longitudinal axis of the adapter.

5. The system of claim 4, wherein the distal portion of each of the plurality of arms includes an engaging feature extending laterally therefrom to engage a distal end of the adapter, when the clip is drawn proximally over the adapter, to prevent a further proximal movement of the clip relative to the adapter.

6. The system of claim 5, wherein, when engaging features engage the distal end of the adapter, the distal portion of each of the plurality of arms engages the adapter to maintain the plurality of arms toward the open configuration.

7. The system of claim 1, wherein the distal end of the adapter includes a lip protruding radially outward therefrom.

8. The system of claim 1, wherein the distal end of each of the arms extending laterally inward relative to one another and including a tissue gripping feature.

9. The system of claim 1, wherein the base portion is ring-shaped.

10. The system of claim 1, further comprising:
a second control member releasably coupled to the base portion of the clip and movably connected to the adapter so that a longitudinal movement of the second control member relative to the adapter moves the clip between the insertion configuration, the initial deployed configuration, and the review configuration; and
a second extending member extending longitudinally from a proximal end accessible to a user of the system to a distal end, the second control member slidably received within the second extending member so that the distal end of the second control member extends distally from the distal end of the second control member to be coupled to the clip.

11. A clipping system for treating tissue, comprising:
an endoscope extending longitudinally from a proximal end to a distal end;
an adapter mountable over a distal end of the endoscope such that a channel of the adapter is aligned with a longitudinal axis of the endoscope;
a clip including a ring-shaped base portion configured to be mounted over the adapter and a plurality of arms extending distally from the base portion, the plurality of arms movable relative to one another between an insertion configuration, in which the plurality of arms extend along an exterior surface of the adapter so that distal ends of the plurality of arms are separated from one another in an open configuration to receive tissue therebetween, and an initial deployed configuration, in which the clip is moved distally off of the adapter so that the distal ends of the plurality of arms revert toward a biased closed configuration in which the distal ends thereof are drawn toward one another to grip tissue therebetween; and
first and second control members releasably coupled to the base portion of the clip and movably connected to the adapter so that a longitudinal movement of the first and second control members relative to the adapter moves the clip between the insertion configuration, the initial deployed configuration, and a review configuration, in which the endoscope is permitted to be withdrawn proximally away from the clip while the first and second control members remain coupled to the clip to enhance visual observation of the clip via the endoscope, the first and second control members being operable to retract the clip proximally over the adapter toward the insertion configuration so that the plurality of arms is forced open as the clip is retracted over the adapter freeing the clip from tissue on which it had been clipped.

12. The system, of claim 11, wherein each of the first and second control members includes an enlarged distal engaging a distal face of the base portion with a remaining length of the first control member extending proximally through an opening of the base portion to a proximal end of the first control member accessible to a user, the enlarged distal end of the first control member being connected to the remaining length of the first control member via a joint configured to release when subject to a force exceeding a predetermined threshold value.

13. The system of claim 12, further comprising first and second extending members extending longitudinally from a proximal end accessible to a user of the system to a distal end, each of the first and second extending members configured to slidably receive a corresponding one of the first and second control members therein so that drawing the clip proximally against distal ends of the first and second extending members via the first and second control members releases the clip from proximal portions of the first and second control members.

14. The system of claim 11, wherein each of the arms includes a proximal portion and a distal portion movably connected to one another via a hinge which biases each of the arms toward the closed configuration, in which the proximal and distal portion of a first one of the arms is bent relative to the distal portion of a second one of the arms so that distal ends of the first and second arms extend toward a longitudinal axis of the adapter.

15. The system of claim 14, wherein the adapter includes a lip protruding radially outward from the distal end of the adapter so that, when the distal portions of the arms engage the lip, the distal portions of the arms are lifted over the adapter.

16. A method for treating tissue, comprising:

inserting a clip to a target area in a body lumen via an endoscope, the clip mounted in an open insertion configuration over a distal end of the endoscope via an adapter, wherein in the open insertion configuration a base portion of the clip is mounted over the adapter such that arms extending distally from the base portion extend along an exterior surface of the adapter with distal ends of the arms of the clip separated from one another;

drawing tissue into a channel of the adapter and between the arms of the clip;

moving the clip from the open insertion configuration toward an initial deployed configuration by moving distally, relative to the endoscope, distal ends of control members releasably coupled to the base portion of the clip so that the control members push the clip distally off of the adapter freeing the arms to revert toward a biased closed configuration in which distal ends of the arms extend toward one another to grip tissue therebetween; and drawing the endoscope proximally away from the clip, while the clip remains coupled to the distal ends of the control members, toward a review configuration in which a visualization of the clip via the endoscope is enhanced.

17. The method of claim 16, wherein, when it is determined that the clip requires repositioning, drawing the control members proximally relative to the endoscope until the clip is drawn proximally over the adapter toward the open insertion configuration, and repositioning the clip over the target tissue.

18. The method of claim 16, further comprising moving the clip from the review configuration toward a final deployed configuration by drawing the control members proximally relative to the endoscope so that the clip is drawn proximally against distal ends of extending members, through which the control members are slidably received, until a force exerted on the control members exceeds a predetermined threshold force, separating an enlarged distal end of each of the control members from a remaining length thereof to release the clip from the endoscope.

19. The method of claim 18, wherein the enlarged distal end of each of the control members are positioned against a distal face of the base portion of this clip so that a remaining length of each of the control members extends proximally through an opening of the base portion, and distal ends of the extending members are positioned immediately proximal the base portion of the clip so that the control members and the extending members are moved simultaneously relative to the endoscope to move the clip between the open insertion configuration, the initial deployed configuration and the review configuration.

20. The method of claim 18, wherein moving the clip toward the final deployed configuration includes moving the extending members distally relative to the endoscope until the distal ends are positioned against a proximal face of the base portion of the clip so that the clip may be drawn proximally thereagainst.

* * * * *